US010640623B2

(12) United States Patent
Saomoto et al.

(10) Patent No.: US 10,640,623 B2
(45) Date of Patent: May 5, 2020

(54) POROUS BODY, AND METHOD FOR PRODUCING POROUS BODY

(71) Applicant: NITTO DENKO CORPORATION, Osaka (JP)

(72) Inventors: Kenjiro Saomoto, Osaka (JP); Naoyuki Matsuo, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 15/562,667

(22) PCT Filed: Mar. 30, 2016

(86) PCT No.: PCT/JP2016/060584
§ 371 (c)(1),
(2) Date: Sep. 28, 2017

(87) PCT Pub. No.: WO2016/159196
PCT Pub. Date: Oct. 6, 2016

(65) Prior Publication Data
US 2018/0086891 A1    Mar. 29, 2018

(30) Foreign Application Priority Data

Apr. 2, 2015 (JP) ................................. 2015-076183

(51) Int. Cl.
*C08J 9/36* (2006.01)
*B32B 27/00* (2006.01)
(Continued)

(52) U.S. Cl.
CPC ............... *C08J 9/365* (2013.01); *B32B 27/00* (2013.01); *B32B 27/281* (2013.01);
(Continued)

(58) Field of Classification Search
None
See application file for complete search history.

(56) References Cited

U.S. PATENT DOCUMENTS

| 4,455,396 A | 6/1984 | Al-Tabaqchall et al. |
| 4,547,526 A | 10/1985 | Al-Tabaqchali et al. |

(Continued)

FOREIGN PATENT DOCUMENTS

| CN | 1856533 | 11/2006 |
| CN | 102863647 | 1/2013 |

(Continued)

OTHER PUBLICATIONS

International Search Report from Application No. PCT/JP2016/060584, dated Jul. 5, 2016.

(Continued)

*Primary Examiner* — Chinessa T. Golden
(74) *Attorney, Agent, or Firm* — Greenblum & Bernstein, P.L.C.

(57) ABSTRACT

According to the present invention, there are provided a porous body comprising a porous silicone substrate having communicating pores and a three-dimensional network silicone skeleton which forms the pores and which is formed by a copolymerization of a bifunctional alkoxysilane and a trifunctional alkoxysilane, and a polymeric cover material covering at least a part of a surface of the silicone skeleton, and an a method for producing the porous body. The porous body of the present invention has high flexibility and is strong to tension.

5 Claims, 2 Drawing Sheets

(51) Int. Cl.
  *C08J 9/42* (2006.01)
  *C08J 9/28* (2006.01)
  *B32B 27/28* (2006.01)
  *B32B 27/32* (2006.01)
  *C08G 77/04* (2006.01)
  *C08G 77/06* (2006.01)

(52) U.S. Cl.
  CPC ......... *B32B 27/285* (2013.01); *B32B 27/322* (2013.01); *B32B 27/325* (2013.01); *C08G 77/04* (2013.01); *C08J 9/28* (2013.01); *C08J 9/42* (2013.01); *C08G 77/06* (2013.01); *C08J 2201/00* (2013.01); *C08J 2205/02* (2013.01); *C08J 2205/04* (2013.01); *C08J 2205/05* (2013.01); *C08J 2383/04* (2013.01); *C08J 2483/04* (2013.01)

(56) References Cited

U.S. PATENT DOCUMENTS

| | | | |
|---|---|---|---|
| 7,829,186 B2 | 11/2010 | Yamato et al. | |
| 2004/0216641 A1 | 11/2004 | Hamada et al. | |
| 2007/0036959 A1 | 2/2007 | Yamato et al. | |
| 2007/0178319 A1 | 8/2007 | Hamada et al. | |
| 2008/0011676 A1* | 1/2008 | Olson | B01D 67/0088 210/500.36 |
| 2011/0000279 A1 | 1/2011 | Miyazaki et al. | |
| 2011/0023711 A1 | 2/2011 | Sato et al. | |
| 2012/0077012 A1* | 3/2012 | Liu | B29C 67/202 428/221 |
| 2014/0076070 A1 | 3/2014 | Nakanishi et al. | |

FOREIGN PATENT DOCUMENTS

| | | |
|---|---|---|
| CN | 104194028 A | 12/2014 |
| JP | S57-151630 A | 9/1982 |
| JP | H08-300567 A | 11/1996 |
| JP | 2893104 B2 | 5/1999 |
| JP | 3397255 B2 | 2/2003 |
| JP | 2004-161877 A | 6/2004 |
| JP | 2014-061457 A | 4/2014 |
| WO | 2008/156199 A1 | 12/2008 |
| WO | 2009/096044 A1 | 8/2009 |

OTHER PUBLICATIONS

International Preliminary Report on Patentability from Application No. PCT/JP2016/060584, dated Oct. 3, 2017.
European Search Report issued with respect to Application No. 16773077.9, dated Jul. 27, 2018.
European Search Report issued with respect to Application No. 16773077.9, dated Oct. 9, 2018.
Taiwanese Office Action Application No. 105110635 dated Feb. 18, 2019, pp. 2-6 (with English translation).
Notification of Reasons for Refusal for corresponding JP patent application No. 2015-076183, dated Mar. 19, 2019 (w/ English translation).
Office Action in corresponding European Patent Application No. 16773077.9, dated May 20, 2019.
Decision of Refusal in corresponding Japanese Patent Application No. 2015-076183, dated Nov. 5, 2019 (with English translation thereof).
Office Action in corresponding Taiwanese patent application No. 105110635, dated Sep. 9, 2019 (with English translation).
Office Action in EP16773077.9 dated Aug. 26, 2019.
China Office Action, China Patent Office, Application No. 201680020334.2, dated Jan. 19, 2020, with English translation.

* cited by examiner

POROUS BODY, AND METHOD FOR PRODUCING POROUS BODY

TECHNICAL FIELD

The present invention relates to a porous body and a method for producing a porous body.

BACKGROUND ART

A sol-gel reaction involving phase separation has conventionally been known as a method for obtaining a monolithic porous material having continuous though-holes with controlled sizes in an organic-inorganic hybrid system using an oxide such as silica or titania, and a trifunctional alkoxysilane as starting materials (see Patent Documents 1 and 2). However, in those porous bodies, elastic modulus of a gel is extremely low, and brittleness is high as a whole. Therefore, it was difficult to impart flexibility withstanding large deformation to the porous bodies.

In view of the conventional problems, studies on a monolithic porous material further having high flexibility are proceeding. Patent Document 3 describes the preparation of a silicone monolithic body of an aerogel or xerogel having continuously penetrating flow channels and a silicone skeleton capable of dissolving chemical species by using both a bifunctional group-containing alkoxysilane and a trifunctional group-containing alkoxysilane or trifunctional or higher group-containing alkoxysilane as staring materials, copolymerizing those silanes by a sol-gel reaction, forming a network by Si—O bonds and simultaneously performing phase separation. Patent Document 3 further describes that the silicone monolithic body has both high flexibility and high porosity.

PRIOR ART DOCUMENTS

Patent Document

Patent Document 1: Japanese Patent No. 2893104
Patent Document 2: Japanese Patent No. 3397255
Patent Document 3: JP-A-2014-61457

SUMMARY OF THE INVENTION

Problems that the Invention is to Solve

As a result of investigations on the silicone monolithic body described in Patent Document 3 by the prevent inventors, it became clear that the silicone monolithic body had high flexibility, but was poor in tension, and when tensile stress was applied, the silicone monolithic body easily involved brittle fracture.

Accordingly, an object of the present invention is to provide a porous body having high flexibility and strong to tension.

Means for Solving the Problems

As a result of further extensive and intensive investigations in view of the above problems, the present inventors have found that the above problems can be solved by covering a surface of a porous body with a polymeric cover material, and have reached to complete the present invention.

Specifically, according to the present invention, a porous body comprising a porous silicone substrate having communicating pores and a three-dimensional network silicone skeleton which forms the pores and which is formed by a copolymerization of a bifunctional alkoxysilane and a trifunctional alkoxysilane; and a polymeric cover material covering at least a part of a surface of the porous silicone substrate is provided.

The polymeric cover material may comprise at least one polymeric material selected from the group consisting of silicone, polyimide, polytetrafluoroethylene, polyether ether ketone, polybenzoxazole, polybenzothiazole, polybenzoxazinone, polybenzoimidazole, polyquinazolinedione and polyoxadiazole.

The porous body may have an elastic modulus at 20% strain of 0.01 MPa or more.

The porous body may have a compressive stress at 80% strain of 0.6 MPa or less.

According to the present invention, a porous body having an elastic modulus at 20% strain of 0.01 MPa or more and a compressive stress at 80% strain of 0.6 MPa or less is provided.

According to the present invention, a method for producing a porous body, comprising a covering step of covering, with a polymeric cover material, at least a part of a surface of a porous silicone substrate having communicating pores and a three-dimensional network silicone skeleton which forms the pores and which is formed by a copolymerization of a bifunctional alkoxysilane and a trifunctional alkoxysilane is provided.

In the production method, the covering step may comprise dipping the porous silicone substrate in a solution of a polymeric material for forming the polymeric cover material, and then taking the porous silicone substrate out of the solution.

In the production method, the solution may contain the polymeric material in a concentration of from 0.5 to 5% by weight.

In the production method, the polymeric cover material may comprise at least one polymeric material selected from the group consisting of silicone, polyimide, polytetrafluoroethylene, polyether ether ketone, polybenzoxazole, polybenzothiazole, polybenzoxazinone, polybenzoimidazole, polyquinazolinedione and polyoxadiazole.

Advantageous Effects of the Invention

According to the present invention, a porous body having high flexibility and strong to tension is provided.

MODE FOR CARRYING OUT THE INVENTION

An embodiment of the present invention is described in detail below.

(Porous Body)

The porous body according to one embodiment of the present invention comprises a porous silicone substrate having communicating pores and a three-dimensional network silicone skeleton which forms the pores and which is formed by a copolymerization of a bifunctional alkoxysilane and a trifunctional alkoxysilane, and a polymeric cover material covering at least a part of a surface of the porous silicone substrate.

The porous silicone substrate in the porous body of the present embodiment has communicating pores and a three-dimensional network silicone skeleton that forms the pores. Specifically, the porous silicone substrate has a monolithic structure. The "monolithic structure" used herein is a bicontinuous structure integrally constituted of a continuous three-dimensional network skeleton and communicating pores.

Figure 1:
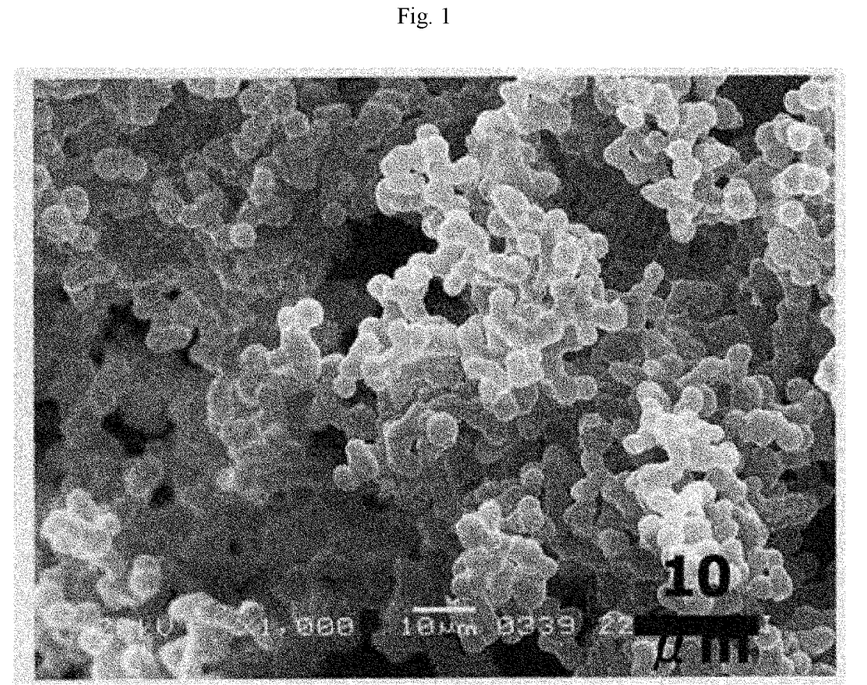
FIG. 1 is an electron micrograph of a porous silicone substrate used in the porous body of the present invention.

The silicone skeleton in the porous silicone substrate is formed by copolymerization of a bifunctional alkoxysilane and a trifunctional alkoxysilane. The porous silicone substrate has a monolithic structure having the three-dimensional network shaped silicone skeleton thus formed and communicating pores, and as a result, can have high flexibility and high heat resistance based on siloxane bonds. An electron micrograph of the porous silicone substrate according to one embodiment is shown in FIG. 1.

The bifunctional alkoxysilane has four bonding groups bonded to silicon. Of the four bonding groups, two groups are alkoxy groups that participate in polymerization (bonding), and the remaining two groups are modifying groups that do not participate in a reaction. The bifunctional alkoxysilane is represented by the following chemical formula (1).

The alkoxy group (—OR$_1$) in the bifunctional alkoxysilane is preferably an alkoxy group having 1 to 5 carbon atoms. From the standpoint of hydrolysis reaction rate, the alkoxy group is preferably methoxy group, ethoxy group or propoxy group, and more preferably methoxy group or ethoxy group. Two alkoxy groups (—OR$_1$) in the bifunctional alkoxysilane may be the same or different.

Examples of the modifying group (—R$_2$) in the bifunctional alkoxysilane include a substituted or unsubstituted alkyl group, an aryl group, a vinyl group and a mercaptoalkyl group.

The alkyl group in the substituted or unsubstituted alkyl group is preferably an alkyl group having 1 to 5 carbon atoms. Methyl group or ethyl group is preferred, and methyl group is more preferred. Example of the substituent includes a halogen element such as fluorine, chlorine, bromine or iodine. The substituted alkyl group is preferably a fluoroalkyl group.

Examples of the aryl group include phenyl group, tolyl group, xylyl group, biphenyl group and naphthyl group. Phenyl group is preferred.

Examples of the mercaptoalkyl group include mercaptomethyl group, mercaptoethyl group and mercaptopropyl group. Mercaptopropyl group is preferred.

Two modifying groups (—R$_2$) in the bifunctional alkoxysilane may be the same or different. From the standpoint of imparting functions such as water repellency and heat resistance to the structure to be obtained, at least one of those two modifying groups is preferably selected from the group consisting of methyl group, phenyl group and a fluoroalkyl group.

Examples of the bifunctional alkoxysilane specifically include dimethyl dimethoxysilane, methylphenyl dimethoxysilane, methylvinyl dimethoxysilane, 3-mercaptopropylmethyl dimethoxysilane and 3,3,3-trifluoropropylmethyl dimethoxysilane. From the standpoint of improvement of heat resistance, dimethyl dimethoxysilane and methylphenyl dimethoxysilane are particularly preferred. The bifunctional alkoxysilane may be used in one kind alone or as mixtures of two or more kinds.

The trifunctional alkoxysilane has four bonding groups bonded to silicon. Of the four bonding groups, three groups are alkoxy groups that participate in polymerization (bonding), and the remaining one group is a modifying group that does not participate in a reaction. The trifunctional alkoxysilane is represented by the following chemical formula (2).

Examples of the alkoxy group (—OR$_3$) in the trifunctional alkoxysilane include the same groups as in the alkoxy group (—OR$_1$) in the bifunctional alkoxysilane. Examples of the modifying group (—R$_4$) in the trifunctional alkoxysilane include the same groups as in the modifying group (—R$_2$) in the bifunctional alkoxysilane.

The modifying group in the trifunctional alkoxysilane is preferably methyl group, phenyl group or a fluoroalkyl group, from the standpoint of imparting functions such as water repellency and heat resistance to the structure to be obtained.

Examples of the trifunctional alkoxysilane specifically include methyl trimethoxysilane, vinyl trimethoxysilane and 3-mercaptopropyl trimethoxysilane. Methyl trimethoxysilane is particularly preferred from the standpoint of the improvement of heat resistance. The trifunctional alkoxysilane may be used in one kind alone or as mixtures of two or more kinds.

In the present embodiment, tri- or more polyfunctional alkoxysilanes may be further copolymerized together with the bifunctional alkoxysilane and trifunctional alkoxysilane. The tri- or more polyfunctional alkoxysilanes used herein mean silanes having more than three alkoxy groups participating in polymerization (bonding). Examples of the tri- or more polyfunctional alkoxysilanes include alkoxysilanes having Si—C—C—Si— structure or —Si— phenyl-Si— structure. The number of bonding groups to Si is 4. However, by using the alkoxysilanes having —Si—C—C—Si— structure or —Si-phenyl-Si— structure as a crosslinking agent, 6 functional groups can be utilized, and denser silicone network can be formed.

Example of the alkoxysilane having —Si—C—C—Si— structure includes 1,2-bis(methyldiethoxysilyl)ethane.

Polymerization ratio between the bifunctional alkoxysilane and the trifunctional alkoxysilane can be appropriately selected considering properties and the like of a desired porous silicone substrate, and is not particularly limited. The polymerization ratio (bifunctional alkoxysilane:trifunctional alkoxysilane) is preferably 2:8 to 6:4, and more preferably 3:7 to 5:5, in volume ratio. When the polymerization ratio is 2:8 or more, it is preferred in imparting flexibility to a porous body to be obtained. Furthermore, when the polymerization ratio is 6:4 or less, it is preferred in maintaining mechanical strength.

When the tri- or more polyfunctional alkoxysilanes are further copolymerized together with the bifunctional alkoxysilane and trifunctional alkoxysilane, the polymerization ratio of the tri- or more polyfunctional alkoxysilanes is not particularly limited. However, volume ratio to the total of the bifunctional alkoxysilane and trifunctional alkoxysilane (total of bifunctional alkoxysilane and trifunctional alkoxysilane:tri- or more polyfunctional alkoxysilanes) is, for example, 6:4 to 4:6.

In the porous silicone substrate in the porous body of the present embodiment, the proportion of unreacted parts in the silicone skeleton is preferably 10 mol % or less from the standpoint of recoverability of heat-resistant cushioning properties. Thus, when the proportion of unreacted parts in the silicone skeleton is controlled to small proportion, the porous body comprising the porous silicone substrate has high flexibility and high heat resistance due to its structure, further is strong to tension, and additionally can exhibit excellent recoverability of heat-resistant cushioning properties.

In the present embodiment, the proportion of unreacted parts in the silicone skeleton can be derived from the measurement result by solid $^{29}$Si-NMR.

The silicone skeleton in the porous silicone substrate is formed by the copolymerization between the bifunctional alkoxysilane and the trifunctional alkoxysilane. When the porous silicone substrate is analyzed by solid $^{29}$Si-NMR, peaks due to the following four structural units are observed in NMR spectrum obtained. The structural unit of the chemical formula (3) is referred to as D1, the structural unit of the chemical formula (4) is referred to as D2, the structural unit of the chemical formula (5) is referred to as T2, and the structural unit of the chemical formula (6) is referred to as T3. The structural units D1 and D2 are structural units derived from the bifunctional alkoxysilane, and the structure units T2 and T3 are structural units derived from the trifunctional alkoxysilane.

(3)

(In the formula, $R_5$ represents H or $R_1$. $R_1$ and $R_2$ are the same as defined in the chemical formula (1))

(4)

(In the formula, $R_2$ is the same as defined in the chemical formula (1))

(5)

(In the formula, $R_6$ represents H or $R_3$. $R_3$ and $R_4$ are the same as defined in the chemical formula (2))

(6)

(In the formula, $R_4$ are the same as defined in the chemical formula (2))

The structural unit D1 has $OR_5$ as an unreacted group. The structural unit T2 also has $OR_6$ as an unreacted group. On the other hand, the structural units D2 and T3 do not have an unreacted group. The proportion (mol %) of each structural unit can be derived from an integrated value of each peak in NMR spectrum obtained by solid $^{29}$Si-NMR analysis. When the structural units D1 and T2 are unreacted parts and the structural units D2 and T3 are reacted parts, the total of the proportion (mol %) of the unreacted parts (the structural units D1 and T2) occupied in the whole structural units is defined as the proportion of unreacted parts in the silicone skeleton.

When tri- or more polyfunctional alkoxysilanes have been further copolymerized together with the bifunctional alkoxysilane and trifunctional alkoxysilane, the proportions of the structural units (unreacted parts) having unreacted groups derived from more than trifunctional alkoxysilanes and the structural units (reacted parts) that do not have unreacted groups are similarly derived in addition to the structural units D1, D2, T2 and T3, and the total of the proportions (mol %) of the structural unit D1, the structural unit T2 and the structural unit having unreacted groups derived from tri- or more polyfunctional alkoxysilanes occupied in the whole structural units is defined as the proportion of unreacted parts in the silicone skeleton.

In the present embodiment, the proportion of unreacted parts in the silicone skeleton is preferably 10 mol % or less, more preferably 9 mol % or less, and still more preferably 8 mol % or less, from the standpoint of recoverability of heat-resistant cushioning properties. When the proportion of unreacted parts is controlled to 10 mol % or less, excellent recoverability of heat-resistant cushioning properties can be obtained. On the other hand, the lower limit of the proportion of the unreacted parts is not particularly limited. However, when the proportion is excessively small, flexibility may deteriorate. Therefore, the proportion of unreacted parts is, for example, 2 mol % or more, and preferably 3 mol % or more.

The proportion of unreacted parts in the silicone skeleton can be controlled by, for example, a heat treatment (annealing treatment) described hereinafter. Furthermore, the proportion can also be controlled by irradiation with ultraviolet rays emitted from laser, LED, lamp light source or the like. Furthermore, the proportion of the unreacted parts is changeable by a chemical bond with a polymeric material forming a polymeric cover material described hereinafter.

(Polymeric Cover Material)

In the porous body of the present embodiment, the polymeric cover material covers at least a part of a surface of the three-dimensional network silicone skeleton of the porous silicone substrate.

The term "the polymeric cover material covers the surface of the three-dimensional network silicone skeleton of the porous silicone substrate" means that the polymeric cover material directly or indirectly covers at least a part of the surface of the three-dimensional network silicone skeleton of the porous silicone substrate. The embodiment that "the polymeric cover material covers at least a part of the surface of the three-dimensional network silicone skeleton of the porous silicone substrate" is sometimes described as "the polymeric cover material covers the porous silicone substrate", "the porous silicone substrate is covered with the polymeric cover material" or the like for simplicity.

The polymeric cover material may cover only a part of the surface of the three-dimensional network silicone skeleton of the porous silicone substrate, or may cover the entire surface of the three-dimensional network silicone skeleton of the porous silicone substrate. The surface of the three-dimensional network silicone skeleton of the porous silicone substrate comprises the part forming (demarcating) an external form of the porous silicone substrate itself and the part forming (demarcating) the communicating pores.

According to the present embodiment, the porous silicone substrate is covered with the polymeric cover material, and as a result, a porous body strong to tension (that is, having high tensile strength) can be obtained. Although the reason is not clear, the following two reasons are assumed.

The first reason is that the three-dimensional network silicone skeleton of the porous silicone substrate is formed by the bonding of a plurality of particles in a continuous form as shown in the SEM photograph of FIG. 1. In such a silicone skeleton, bonding force at the interface among particles bonded is weak. Therefore, it is assumed that when tensile stress is applied, fracture occurs at the interface among the particles bonded. In the present embodiment, the polymeric cover material covers the surface of the skeleton of the porous silicone substrate. Therefore, it is assumed that the polymeric cover material in the vicinity of the interface among the particles bonded acts so as to physically reinforce bonding force of those particles, thereby enhancing tensile strength of the porous body.

As the second reason, it is assumed that depending on the kind of the polymeric material for forming the polymeric cover material, the polymeric material chemically bonds to an unreacted part of the silicone skeleton of the porous silicone substrate, thereby enhancing tensile strength of the porous body.

In the present embodiment, the coverage of the surface of the silicone skeleton of the porous silicone substrate by the polymeric cover material is not particularly limited so long as the effect of enhancing desired tensile strength is exhibited. However, the surface part uncovered by the polymeric cover material is relatively weak to tension. For this reason, the proportion of the uncovered surface part is preferred to be small. From this standpoint, the coverage is preferably 50% or more, more preferably 75% or more, still more preferably 90% or more, and particularly preferably 100% (that is, the state that the entire surface of the silicone skeleton of the porous silicone substrate is covered with the polymeric cover material).

From the same reason as above, to satisfactorily enhance tensile strength, it is preferred that the polymeric cover material covers not only the part forming (demarcating) an external form of the porous silicone substrate itself on the surface of the silicone skeleton of the porous silicone substrate, but also the part forming (demarcating) the communicating pores. Furthermore, in order that the porous body has excellent flexibility, it is preferred that the polymeric cover material is formed in a range that the communicating pores are not embedded by the polymeric cover material.

Any polymeric material can be used as the polymeric material forming the polymeric cover material without particular limitation so long as it can enhance tensile strength of the porous body obtained. Examples of the polymeric material include silicone such as a silicone resin or a silicone rubber; polyimide; polyamide such as polyphthalamide; polyamide imide; a polyolefin resin such as polyethylene, polypropylene, an ethylene-vinyl acetate copolymer or an ethylene-(meth)acrylate copolymer; a polystyrene resin such as polystyrene; a cellulose resin such as cellulose acetate, cellulose triacetate, cellulose acetate butyrate, nitrocellulose or carboxymethyl cellulose; a rubber material such as isoprene rubber, nitrile rubber, perfluororubber, chloroprene rubber, acrylic acid ester rubber, styrene-butadiene rubber, cis-1,4-polybutadiene synthetic rubber or natural rubber; a urea resin such as a urea-formaldehyde resin; a vinyl resin such as polyvinyl chloride, chlorinated polyvinyl chloride, a polyvinyl chloride-vinyl acetate copolymer, vinyl chloride octyl acrylate, polyvinyl acetate or polyvinyl fluoride; an epoxy resin; a vinylidene chloride resin such as polyvinylidene chloride; an acryl resin such as polyacrylic acid or polymethyl methacrylate; a fluorine resin such as polytetrafluoroethylene (polyethylene tetrafluoride); a polyester resin such as polyethylene terephthalate or polybutylene terephthalate; an acrylonitrile-butadiene-styrene copolymer, a non-crystalline poly α-olefin-atactic polypropylene-acrylonitrile-styrene copolymer, acrylonitrile styrene acrylate, a cresol resin, cresol formaldehyde, ethylenediaminetetraacetic acid, an ethylene-chlorotrifluoroethylene copolymer, an ethylene-methyl acrylate copolymer, an ethylene-ethyl acrylate copolymer, an ethylene-propylene-diene terpolymer, an ethylene-tetrafluoroethylene copolymer, ethyl vinyl ether, an ethylene vinyl alcohol copolymer, polyallyl ether ketone, polyacrylonitrile, polyallylsulfone, polycarbonate, polydicyclopentadiene, polyether nitrile, polyethylene naphthalate, polyethylene oxide, polyether sulfone, polyethylene terephthalate, polyether ether ketone, tetrafluoroethylene perfluoroalkyl, vinyl ether copolymer, polyisobutylene, polyphenylene oxide, polyphenylene ether, polysulfone, polyvinyl alcohol, polyvinylidene fluoride polyvinylidene fluororethylene, polyvinyl pyrrolidone, polyvinyl alcohol a styrene-ethylene-propylene-styrene block copolymer, a styrene-isoprene-styrene block copolymer, polyurethane, polybenzoxazole, polybenzothiazole, polybenzimidazole, polyquinazolinedione, polybenzoxadinone and polyoxadiazole. Those may be used in one kind alone, and can be used by appropriately combining two or more kinds thereof.

Silicone, polyimide, polytetrafluoroethylene, polyether ether ketone, polybenzoxazole, polybenzothiazole, polybenzoxadinone, polybenzimidazole, polyquinazolinedione, polyoxadiazole and the like are preferred from the standpoint of heat resistance.

Of those, silicone is preferred from the standpoint of affinity between a porous silicone substrate and a silicone skeleton. The silicone is a polymer having a siloxane bond (≡Si—O—Si≡) comprising silicon and oxygen as a skeleton and an organic group mainly comprising a methyl group (—CH$_3$) bonded to the silicone (Si). The organic group in a side chain of the silicone may be, other than a methyl group, an inert group such as a phenyl group, a diol group, a methacryl group, a silanol group, a phenol group, a polyether group, a straight-chain alkyl group other than a methyl group, a fluoroalkyl group, a fatty acid amide group, an aralkyl group, and may be a reactive functional group such as a (di)epoxy group, a (di)amino group, a vinyl group, a carbinol group, a mercapto group, a carboxyl group, an acryl group or a methacryl group. The silicone may be a straight chain form (oil) and may have a branched (resin) structure or a cyclic structure. Specific examples of the silicone include dimethyl silicone, methyl hydrogen silicone, methyl phenyl silicone, cyclic dimethyl silicone, silicones modified with the above-described various organic groups and silicones modified with the above-described various reactive functional groups. In case where the silicone having a cyclic structure is used as the polymeric cover material, the cyclic structure may be ring-opened by an appropriate catalyst such as a platinum catalyst or an acid or base catalyst.

The number average molecular weight of the polymeric material is not particularly limited, and is, for example, form about 100 to 1,000,000, and preferably from 500 to 500,000. The number average molecular weight of the polymeric material is measured by gel permeation chromatography (GPC).

The method of covering the porous silicone substrate with the polymeric cover material includes a method of dipping the porous silicone substrate in a solution containing the polymeric material, and taking the porous silicone substrate out of the solution (hereinafter referred to as a dip coating method). Other than the dip coating method, various wet coating methods such as a reverse coating method, a spray coating method, a bar coating method, a gravure coating method, a rod coating method, a die coating method, a spin coating method and an extrusion coating method can be used. After forming a coating film of the solution containing the polymeric material on the surface of the porous silicone substrate by wet coating, the solvent is appropriately removed by natural drying, drying by heating, or the like, thereby forming a polymeric cover material. The drying is conducted under the conditions, for example, at a temperature of from 20 to 250° C. for from 2 to 24 hours.

A solvent of the solution containing the polymeric material is appropriately selected considering the kind of the polymeric material, and the like, and is not particularly limited. Examples of the solvent that can be used include chloroform, carbon tetrachloride, 1,2-dichloroethane, 1,2-dichloroethylene (another name: acetylene dichloride), 1,1,2,2-tetrachloroethane (another name: acetylene tetrachloride), trichloroethylene, carbon disulfide, acetone, isobutyl alcohol, isopropyl alcohol, isopentyl alcohol (another name: isoamyl alcohol), benzyl alcohol, phenol, diethyl ether, ethylene glycol monoethyl ether (another name: cellosolve), ethylene glycol monoethyl ether acetate (another name: cellosolve acetate), ethylene glycol mono-normal-butyl ether (anther name: butyl cellosolve), ethylene glycol monomethyl ether (another name: methyl cellosolve), ortho-dichlorobenzene, xylene, cresol, chlorobenzene, dimethylsulfoxide, isobutyl acetate, isopropyl acetate, isopentyl acetate (another name: isoamyl acetate), methyl acetate, ethyl acetate, normal-butyl acetate, normal-propyl acetate, normal-pentyl acetate (another name: normal-amyl acetate), methyl acetate, cyclohexanol, cyclohexanone, 1,4-dioxane, dichloromethane (another name: methylene dichloride), N,N-dimethylformamide, styrene, tentrachloroethylene (another name: perchloroethylene), terahydrofuran, 1,1,1-trichloroethane, toluene, hexane, pentane, petane, octane, cyclohexane, 1-butanol, 2-butanol, methanol, methyl isobutyl ketone, methyl ethyl ketone, methyl cyclohexanol, methyl cyclohexanone, methyl-normal-butyl ketone, gasoline, coal tar naphtha (including solvent naphtha), glycerin, petroleum ether, petroleum naphtha, petroleum benzine and turpentine oil. At least one of those can be appropriately selected and used.

The concentration of the polymeric material in the solution containing the polymeric material can be appropriately adjusted by the polymeric material used, the kind of the solvent, and the like, and is not particularly limited. To satisfactorily exhibit the effect of enhancing tensile strength of the porous body by covering with the polymeric cover material, the concentration is preferably 0.1% by weight or more, more preferably 0.5% by weight or more, and still more preferably 1% by weight or more. On the other hand, in order that the porous body has excellent flexibility, the concentration is preferably 10% by weight or less, more preferably 5% by weight or less, and still more preferably 3% by weight or less.

The solution containing the polymeric material may further contain substances other than the polymeric material and solvent. For example, to enhance adhesion between the polymeric cover material and the silicone skeleton of the porous silicone substrate, the solution may contain an organic binder.

As the method of covering the porous silicone substrate with the polymeric cover material, a method of depositing the polymeric material in a volatilized state on the porous silicone substrate, a method of mixing a powdery polymeric material with a gel becoming the porous silicone substrate, heating and melting the resulting mixture, and then solidifying the mixture, and the like, other than the above-described various wet coating methods such as the dip coating method can be used. To uniformly cover the entire surface of the porous silicone substrate with the polymeric material, a dip coating method, a method of depositing the polymeric material in a volatilized state on the porous silicone substrate, and the like are preferred.

The polymeric cover material covered on the surface of the porous silicone substrate is hardened as necessary. The polymeric cover material is hardened by, for example, heating, or irradiation with light such as ultraviolet rays or electron beams. Furthermore, as necessary, a catalyst, a crosslinking agent or the like may be added to the polymeric material.

In the present embodiment, the covering form of the polymeric cover material is not particularly limited. For example, the porous silicone substrate may be covered with the polymeric cover material in the form of a covering layer. Thickness of the covering layer in the form of a covering layer is appropriately adjusted depending on porosity, an average pore size of pores, and the like required in the porous body, and is not particularly limited. The thickness is, for example, from 10 to 5,000 nm, and preferably from 100 to 1,000 nm.

The porous body of the present embodiment has a bulk density of preferably from 0.01 to 0.3 g/cc, and more preferably from 0.08 to 0.2 g/cc, from the standpoint that both high tensile strength and excellent flexibility are achieved. The bulk density of the porous body can be measured by measuring a weight of an apparent volume of a porous body (volume in external form of a porous body).

In the porous body of the present embodiment, a weight ratio between the porous silicone substrate and the polymeric cover material is preferably from 50:1 to 1:1, and more preferably from 30:1 to 2:1. When the weight ratio is within the above range, the effect of enhancing tensile strength of the porous body by covering with the polymeric cover material is satisfactorily exhibited, and additionally, the porous body can have excellent flexibility.

The porous body of the present embodiment preferably has elastic modulus at 20% strain of 0.01 MPa or more. When the elastic modulus at 20% strain is adjusted to be 0.01 MPa or more, brittle fracture does not easily occur when tensile stress has been applied, and a porous body strong in tension (having high tensile strength) can be obtained. The elastic modulus at 20% strain is more preferably 0.02 MPa or more, and still more preferably 0.04 MPa or more. The upper limit of the elastic modulus at 20% strain is not particularly limited, and is, for example, 0.1 MPa or less from the standpoint of flexibility.

In the present description, the elastic modulus at 20% strain of the porous body is a value obtained from a gradient at 20% strain of a tensile stress-strain curve when a tensile test has been conducted at a temperature of 25° C. and a tensile rate of 50 mm/min.

The porous body of the present embodiment preferably has compressive stress at 80% strain of 0.6 MPa or less. When the compressive stress at 80% strain is adjusted to be 0.6 MPa or less, a porous body having excellent flexibility can be obtained. The compressive stress at 80% strain is more preferably 0.4 MPa or less, and still more preferably 0.3 MPa or less. The lower limit of the compressive stress at 80% strain is not particularly limited, and is, for example, 0.05 MPa or more from the standpoint of shape recoverability.

In the present description, the compressive stress at 80% strain of the porous body is a value obtained from a compressive stress-strain curve when a compression test has been conducted at a temperature of 25° C. and a compression rate of 10 mm/min.

The porosity of the porous body of the present embodiment is not particularly limited. The porosity is preferably 50% or more, more preferably 80% or more, and still more preferably 90% or more. When the porosity is less than 50%, flexibility and lightness may deteriorate. On the other hand, when the porosity is too high, mechanical strength may decrease. Therefore, the porosity is preferably 95% or less.

The average pore size of the communicating pores in the porous body of the present embodiment is not particularly limited, but is, for example, 50 to 50,000 nm. The skeleton diameter of the silicone skeleton is not particularly limited, but is, for example, 50 to 10,000 nm. The average pore size of the communicating pores in the porous body can be measured by SEM, optical microscope or the like. Furthermore, the skeleton diameter of the silicone skeleton can be measured by the SEM, the optical microscope or the like. The skeleton diameter of the silicone skeleton shows a skeleton diameter including the polymeric cover material formed on the surface thereof.

The porous body of the present embodiment is that, in an unconfined compression test, shape recovery rate in 10 seconds when the porous body has been compressed to 80% and the pressure has then been released is preferably 90% or more, more preferably 95% or more, and particularly preferably 100%. When the shape recovery rate is 90% or more, high flexibility can be exhibited.

The porous body of the present embodiment is that in TG-GTA (Thermogravimetry-Differential Thermal Analysis), the thermal decomposition initiation temperature is preferably 300° C. or higher, and more preferably 350° C. or higher, from the standpoint of heat resistance.

The porous body of the present embodiment preferably has excellent recoverability of (heat-resistant) cushioning properties.

The "recoverability of cushioning properties" used herein means properties that when an object is placed under compression at a certain temperature and the pressure is then released, the shape of the object recovers the shape before compression. The "recoverability of heat-resistant cushioning properties" used herein means properties that when an object is placed under compression at high temperature and the pressure is then released, the shape of the object recovers the shape before compression at high temperature.

In the present embodiment, the recoverability of (heat-resistant) cushioning properties can be evaluated as follows.

Test sample having a size of (10 mm×10 mm)×$T_0$ thick is prepared. The test sample is compressed until a thickness of the test sample after compression by a compression tester under a certain test temperature reaches 50% of the thickness before compression, that is, $T_0/2$, and is allowed to stand under the test temperature for 22 hours. To return the test temperature to ordinary temperatures (23° C.), the test sample is allowed to stand at ordinary temperatures (23° C.) for 2 hours, and the pressure is then released. After the lapse of 1 minute, the thickness ($T_1$) of the test sample is measured, and compressive residual strain (50% compression set) is calculated based on the following formula.

Compressive residual strain (50% compression set) (%)=$(T_0-T_1)/T_0 \times 100$ $T_0$: Thickness (mm) before test
$T_1$: Thickness (mm) after test It says that recoverability of (heat-resistant) cushioning properties at the test temperature is excellent as the compressive residual strain (50% compression set) thus calculated is small. The porous body of the present embodiment is that the compressive residual strain (50% compression set) at a test temperature of 150° C. is preferably 5% or less, and more preferably 2% or less. Furthermore, the compressive residual strain (50% compression set) at a test temperature of 250° C. is preferably 10% or less, more preferably 5% or less, and particularly preferably 3% or less. Furthermore, the compressive residual strain (50% compression set) at a test temperature of 23° C. (ordinary temperature) is preferably 3% or less, more preferably 1% or less, and particularly preferably 0.5% or less.

The porous body according to one embodiment of the present invention is that elastic modulus at 20% strain is 0.01 MPa or more, and compressive stress at 80% strain is 0.6 MPa or less. The porous body according to the present embodiment can be obtained by, for example, covering the porous silicone substrate with the polymeric cover material.

(Method for Producing Porous Body)

The method for producing a porous body of the present invention is described below.

A porous silicone substrate is prepared, for example, as follows.

In one embodiment for preparing the porous silicone substrate, a porous silicone substrate having communicating pores and a three-dimensional network silicone skeleton that forms the pores is formed by copolymerizing a bifunctional alkoxysilane and a trifunctional alkoxysilane by a sol-gel reaction involving phase separation Specifically, the bifunctional alkoxysilane and trifunctional alkoxysilane are used as precursors, network of Si—O bonds is formed by copolymerization of those by a sol-gel reaction and simultaneously an acid-base two step reaction is conducted by an acid catalyst and a base catalyst while controlling phase separation by a surfactant, thereby forming a porous silicone substrate having communicating pores and a three-dimensional network silicone skeleton that forms the pores. One embodiment of this step is described below.

Acetic acid as an acid catalyst is mixed with water as a solvent in a vessel such as a glass vessel to prepare an acetic acid aqueous solution. n-Hexadecyltrimethylammonium chloride (CTAC) as a surfactant and urea as a base catalyst are then added to the acetic acid aqueous solution.

Bifunctional alkoxysilane and trifunctional alkoxysilane as precursors are added to the resulting mixture, followed by stirring, for example, at 10 to 30° C. for 0.5 to 2.0 hours, thereby proceeding hydrolysis of the precursors.

The solution obtained is transferred to a closed vessel, and heated, for example, at 50 to 85° C. for 6 to 48 hours. Urea is hydrolyzed, and under basic conditions, the precursors hydrolyzed are polycondensed by a sol-gel reaction. Thus, a wet gel is obtained.

The wet gel obtained is impregnated into, for example, a mixed solution of water and isopropyl alcohol, and the resulting mixture is washed with isopropyl alcohol, methanol or the like to remove unreacted precursors and surfactants.

The monolithic gel thus obtained is impregnated into a non-polar solvent such as normal hexane to perform solvent substitution, followed by drying, for example, at 20 to 80° C. for 5 to 24 hours. Thus, a porous silicone substrate having a monolithic structure is obtained as a xerogel. Furthermore, a porous silicone substrate having a monolithic structure as an aerogel can also be obtained by further subjecting the monolithic gel obtained above to supercritical drying with carbon dioxide gas or the like.

In the present step, the kinds of materials and the order of addition thereof, reaction conditions, and the like can be appropriately adjusted so long as a porous silicone substrate having the desired monolithic structure is obtained, and therefore, the present step is not limited to the above embodiment. For example, cetyltrimethylammonium bromide (CTAB) or the like may be used as a surfactant in place of n-hexadecyltrimethylammonium chloride (CTAC). Oxalic acid, formic acid or the like may be used as an acid catalyst in place of acetic acid. Ammonia water or the like may be used as a base catalyst in place of urea. Furthermore, in addition to the bifunctional alkoxysilane and trifunctional alkoxysilane, tri- or more polyfunctional alkoxysilanes may be further used as a precursor.

Subsequently, at least a part of a surface of the porous silicone substrate prepared is covered with a polymeric cover material to produce a porous body. In covering the porous silicone substrate with the polymeric cover material, various wet coating methods such as the dip coating method described before are appropriately carried out.

In the present embodiment, an annealing treatment may be further conducted. The annealing treatment is carried out by subjecting a porous silicone substrate or a porous body after covering the porous silicone substrate with a polymeric cover material to a heat treatment (annealing treatment) at a temperature lower than the thermal decomposition initiation temperature thereof. Specifically, the heat treatment (annealing treatment) may be conducted before covering the porous silicone substrate with the polymeric cover material and may be conducted after covering. The proportion of unreacted parts in the silicone skeleton constituting the porous silicone substrate can be controlled by performing the heat treatment (annealing treatment). The heat treatment (annealing treatment) can be performed by, for example, maintaining the porous silicone substrate or porous body in a heating furnace heated to a given temperature for a given period of time.

The heating temperature in the heat treatment (annealing treatment) is a temperature lower than the thermal decomposition initiation temperature of the porous silicone substrate or porous body, and can be appropriately determined considering the kinds of starting materials used (bifunctional alkoxysilane, trifunctional alkoxysilane and the like) used in the production of the porous silicone substrate, heating time, and the like. The heating temperature is preferably 320° C. or lower, and more preferably 300° C. or lower.

The lower limit of the heating temperature in the heat treatment (annealing treatment) is not particularly limited. The lower limit is, for example, 100° C. or higher, and preferably 150° C. or higher. In order that the porous body has the desired recoverability of heat-resistant cushioning properties, it is preferred that the porous body is subjected to the heat treatment (annealing treatment) at a temperature higher than the temperature at which the porous body is used under compression at high temperature.

The heating time in the heat treatment (annealing treatment) can be appropriately determined considering the kinds of starting materials (bifunctional alkoxysilane, trifunctional alkoxysilane and the like) used in the production of the porous silicone substrate, heating temperature, and the like, and is not particularly limited. The heating time is, for example, 8 hours or more, preferably 12 hours or more, and more preferably 18 hours or more. The heating time is, for example, 120 hours or less, preferably 100 hours or less, more preferably 80 hours or less, still more preferably 70 hours or less, and still further more preferably 60 hours or less. However, where the porous silicone substrate is subjected to the heat treatment (annealing treatment) at high temperature for a long period of time, there is a possibility that the porous silicone substrate deteriorates and does not exhibit the desired flexibility and recoverability of heat-resistant cushioning properties. On the other hand, in the heat treatment (annealing treatment) at low temperature for a short period of time, there is a possibility that the proportion of unreacted parts in the silicone skeleton cannot be sufficiently controlled. Therefore, in performing the heat treatment (annealing treatment), it is preferred to conduct the heat treatment by selecting appropriate conditions in consideration of those.

The porous body of the present invention has high flexibility and additionally has a property strong to tension. Therefore, the porous body can be usefully used as, for example, sound insulating and absorbing materials in the fields of automobiles, housings, aircrafts and the like; sealing materials, impact absorbers and/or vibration-proof materials in the fields of automobiles, electronic parts, home appliances, housings and the like; and heat-insulating materials and/or waterproof materials in the fields of automobiles, aircrafts, housings, electronic parts and the like. Specifically, the porous body of the present invention has high flexibility required in those uses. Additionally, the porous body of the present invention also has a property strong to tension. Therefore, the porous body of the present invention can effectively prevent or suppress the occurrence of adverse influences such as decrease in workability at execution and the occurrence of contamination by dust emission.

EXAMPLES

The present invention is further described below by reference to examples, but the invention is not construed as being limited to the following examples.

(Production of Porous Silicone Substrate)

A porous silicone substrate was first produced by the following procedures.

n-Hexadecyltrimethylammonium chloride (10 g) as a surfactant and urea (50 g) were added to 5 mM acetic acid aqueous solution (150 mL), followed by mixing those in a glass vessel under stirring.

Methyl trimethoxysilane (30 mL) and dimethyl dimethoxysilane (20 mL) as precursors were added to the glass vessel, followed by stirring with a stirrer for 60 minutes. After stirring, the resulting solution was transferred to a closed vessel, and heated at 80° C. for 24 hours, thereby hydrolyzing urea to form basic conditions. The precursors hydrolyzed were polycondensed by a sol-gel reaction under the basic conditions. The wet gel obtained was impregnated into a water/isopropyl alcohol (1:1) solution, and then washed with isopropyl alcohol to remove unreacted reagents and surfactants. The monolithic gel thus obtained was impregnated into normal hexane to perform solvent substitution, and then dried at 60° C. for 24 hours. Thus, a porous silicon substrate having a monolithic structure as a xerogel was obtained.

Production of Porous Body

Example 1

A cyclic silicone (LC 755 manufactured by Dow Corning Toray Co., Ltd.) was dissolved in toluene as a solvent, and the cyclic silicone was ring-opened in the solution by a platinum catalyst to prepare a silicone-containing toluene solution (hereinafter referred as a dipping liquid). The dipping solution was prepared such that the concentration of silicone in the dipping liquid was 1% by weight.

The porous silicone substrate prepared above was dipped in the dipping liquid. It was visually confirmed that the dipping liquid permeated into the inside of pores in the porous silicone substrate. The porous silicone substrate was taken out of the dipping liquid, and dried at 100° C. for 8 hours to remove toluene. Thus, a porous body of Example 1 was produced.

Example 2

A porous body of Example 2 was produced in the same manner as in Example 1 except that the dipping liquid was prepared such that the concentration of silicone in the dipping liquid was 1.5% by weight.

Example 3

A porous body of Example 3 was produced in the same manner as in Example 1 except that the dipping liquid was prepared such that the concentration of silicone in the dipping liquid was 2% by weight.

Example 4

A porous body of Example 4 was produced in the same manner as in Example 1 except that the dipping liquid was prepared such that the concentration of silicone in the dipping liquid was 3% by weight.

Example 5

A porous body of Example 5 was produced in the same manner as in Example 1 except that the dipping liquid was prepared such that the concentration of silicone in the dipping liquid was 5% by weight.

Comparative Example 1

The porous silicone substrate prepared was directly used as a porous body of Comparative Example 1 without performing dipping.

(Elastic Modulus at 20% Strain)

Elastic modulus at 20% strain of each porous body of examples and comparative example was measured. The elastic modulus at 20% strain of each porous body was obtained from a gradient at 20% strain of a tensile stress-strain curve when a tensile test had been conducted at a temperature of 25° C. and a tensile rate of 50 mm/min. In the tensile test, a porous body having a cross-section of 5 mm and 5 mm and a height along a tensile direction of 10 mm was used for the measurement. When the elastic modulus at 20% strain is 0.01 MPa or more, it can be evaluated to be a porous body strong to tension.

Figure 2:
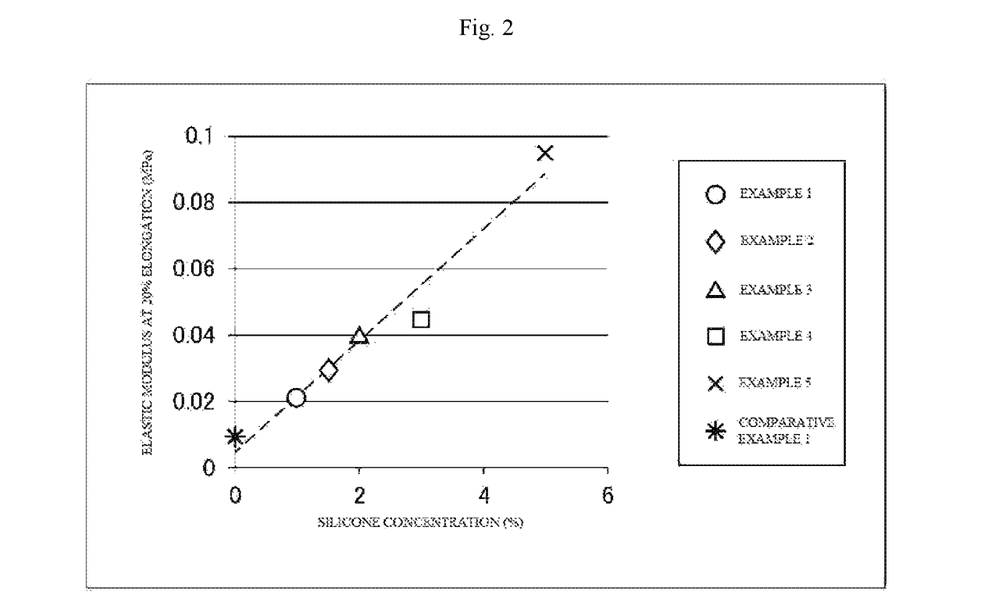
FIG. 2 is a graph showing the relationship between a concentration of a silicone elastomer in a dipping liquid and elastic modulus at 20% strain of a porous body in each example and comparative example.

FIG. 2 is a graph showing the relationship between a concentration of a silicone elastomer in a dipping liquid and elastic modulus at 20% strain of a porous body in each example and comparative example. The porous body of Comparative Example 1 without performing dipping is plotted as the concentration of silicone being 0% by weight.

As shown in FIG. 2, the elastic modulus at 20% strain of the porous body was linearly in proportion to the concentration of silicone in the dipping liquid. The porous bodies of Examples 1 to 5 had the elastic modulus at 20% strain of 0.021 MPa, 0.029 MPa, 0.039 MPa, 0.045 MPa and 0.095 MPa, respectively, and were porous bodies strong to tension. On the other hand, the porous body of Comparative Example 1 had elastic modulus at 20% strain of 0.009 MPa, and was a porous body weak in tension.

(Compressive Stress at 80% Strain)

Compressive stress at 80% strain of each porous body of examples and comparative example was measured. The compressive stress at 80% strain of each porous body was obtained from a compressive stress-strain curve when a compression test had been conducted at a temperature of 25° C. and a compression rate of 10 mm/min. In the compression test, a porous body having a cross-section of 10 mm×10 mm and a height along a tensile direction of about 9 to 12 mm was used for the measurement. A compression shaft of a compression testing machine had a cross-section of 8 mm×8 mm. When the compressive stress at 80% strain is 0.3 MPa or less, it can be evaluated to be a porous body having excellent flexibility. When the compressive stress at 80% strain is 0.6 MPa or less, it is said to be porous body having practically allowable flexibility.

Figure 3:
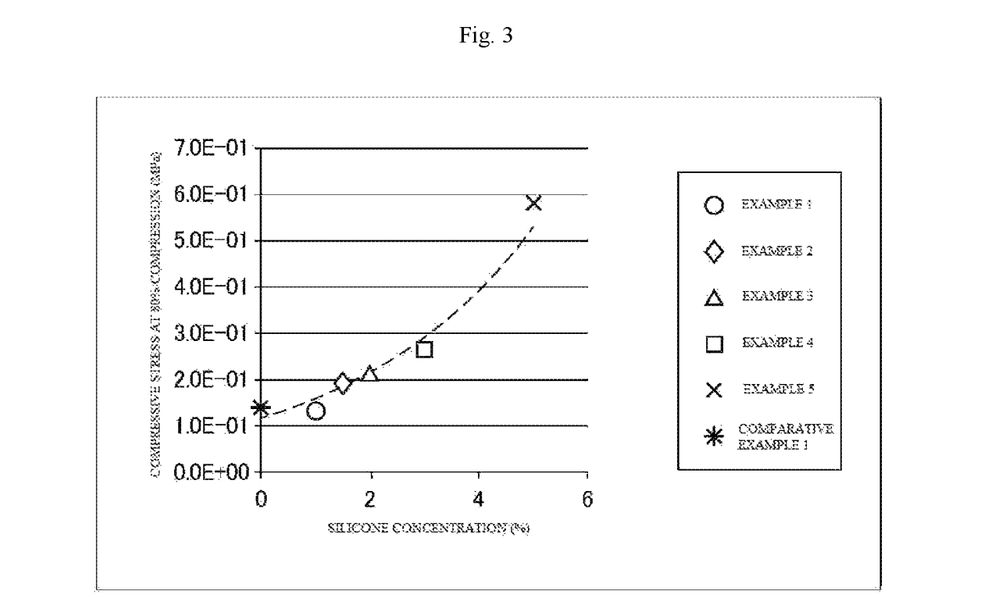
FIG. 3 is a graph showing the relationship between a concentration of a silicone elastomer in a dipping liquid and compressive stress at 80% strain of a porous body in each example and comparative example.

FIG. 3 is a graph showing the relationship between a concentration of a silicone in a dipping liquid and compressive stress at 80% strain of a porous body in each example and comparative example. The porous body of Comparative Example 1 without performing dipping is plotted as the concentration of silicone being 0% by weight.

As shown in FIG. 3, the compressive stress at 80% strain of the porous body was exponentially in proportion to the concentration of silicone in the dipping liquid. The porous bodies of Comparative Example 1 and Examples 1 to 4 had the compressive stresses at 80% strain of 0.14 MPa, 0.13 MPa, 0.19 MPa, 0.21 MPa and 0.27 MPa, respectively, and were porous bodies having excellent flexibility. On the other hand, the porous body of Example 5 had the compressive stress at 80% strain of 0.58 MPa, and was a porous body having flexibility of the practically allowable extent.

Although the present invention has been described in detail and by reference to the specific embodiments, it is apparent to one skilled in the art that various modifications or changes can be made without departing the spirit and scope of the present invention.

This application is based on Japanese Patent Application No. 2015-076183 filed Apr. 2, 2015, the disclosure of which is incorporated herein by reference in its entity.

The invention claimed is:

1. A porous body comprising:
   a porous silicone substrate having communicating pores and a three-dimensional network silicone skeleton which forms the pores and which is formed by a copolymerization of a bifunctional alkoxysilane and a trifunctional alkoxysilane; and
   a polymeric cover material covering at least a part of a surface of the porous silicone skeleton,
   wherein the porous body has an elastic modulus at 20% strain of 0.01 MPa or more, and
   wherein the polymeric cover material consists of silicone, and
   wherein a solution for forming the polymeric cover material contains a polymeric material in a concentration of 1% to 5% by weight.

2. The porous body according to claim 1, having a compressive stress at 80% strain of 0.6 MPa or less.

3. The porous body according to claim 1, wherein the solution for forming the polymeric cover material contains a polymeric material in a concentration of 1% to 3% by weight.

4. A method for producing the porous body according to claim 1, comprising:
   covering, with a polymeric cover material, at least a part of a surface of a porous silicone substrate having communicating pores and a three-dimensional network silicone skeleton which forms the pores and which is formed by a copolymerization of a bifunctional alkoxysilane and a trifunctional alkoxysilane,
   wherein the porous body has an elastic modulus at 20% strain of 0.01 MPa or more.

5. The method according to claim 4, wherein the covering step comprises dipping the porous silicone substrate in a solution of a polymeric material for forming the polymeric cover material, and then taking the porous silicone substrate out of the solution.

* * * * *